United States Patent
Braun et al.

(10) Patent No.: US 6,829,081 B2
(45) Date of Patent: Dec. 7, 2004

(54) IMAGE TRANSISTOR WITH LAMINAR FLOW WATER COOLING SYSTEM

(75) Inventors: David A. Braun, Ft. Collins, CO (US); Robert L. Myers, Loveland, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 366 days.

(21) Appl. No.: 10/071,128

(22) Filed: Feb. 8, 2002

(65) Prior Publication Data

US 2003/0151795 A1 Aug. 14, 2003

(51) Int. Cl.$^7$ .......................... H01S 3/00; G02F 1/1333; G02F 1/135
(52) U.S. Cl. .......................... 359/333; 349/25; 349/161
(58) Field of Search .......................... 359/333; 349/161, 349/25

(56) References Cited

U.S. PATENT DOCUMENTS

| | | | |
|---|---|---|---|
| 4,679,910 A | * | 7/1987 | Efron et al. .................. 349/30 |
| 4,763,993 A | * | 8/1988 | Vogeley et al. ............. 349/161 |
| 5,032,021 A | * | 7/1991 | Kanatani et al. .............. 353/54 |
| 5,602,679 A | | 2/1997 | Dolgoff et al. |
| RE36,060 E | | 1/1999 | Miyashita |
| 5,900,982 A | | 5/1999 | Dolgoff et al. |
| 6,011,640 A | | 1/2000 | Hutton |
| 6,330,112 B1 | | 12/2001 | Kaise et al. |
| 6,339,471 B1 | | 1/2002 | Morita |

* cited by examiner

Primary Examiner—Mark Hellner

(57) ABSTRACT

A light transistor system, including an image transistor, and a coolant passageway extending through the image transistor. The image transistor has a liquid crystal modulator, configured to amplify a low-power light signal using amplification energy from a higher-power light source, such as a laser or arc lamp. The coolant passageway is configured to receive a flow of coolant therethrough, to allow cooling of the image transistor to prevent damage to it from the higher-power light source.

20 Claims, 2 Drawing Sheets

IMAGE TRANSISTOR WITH LAMINAR FLOW WATER COOLING SYSTEM

BACKGROUND OF THE INVENTION

1. Field of the Invention

The present invention relates generally to image transistors for amplifying light signals. More particularly, the present invention relates to a laminar flow water cooling system for an image transistor, which allows the use of higher power light sources without overheating the materials of the image transistor.

2. Related Art

A variety of devices and schemes have been developed for amplifying light signals or images. One of these is known as an image transistor, also called a light valve. These have been known for some time. Image transistors amplify light signals using a liquid crystal modulator to transfer the characteristics of a low power image to a higher power light signal. An image transistor takes an image cast upon its rear surface and uses the photon energy of that image to alter the state of liquid crystal material. The liquid crystal material in turn transfers the characteristics of the image to light energy which is cast upon the front surface of the image transistor. Thus, any light cast upon the front surface of an image transistor is reflected back as the image cast upon the rear surface. Accordingly, image transistors allow amplification and higher power transmission of low power light signals and images, and are very useful for a variety of display devices.

However, liquid crystal material has a very limited operating temperature range. When subjected to intense light, the liquid crystal modulator of an image transistor will overheat and cease to function. Consequently, image transistors have heretofore only been used with low power light sources, and not with lasers or arc lights. This limits their utility and flexibility. If an image transistor could be used with higher power light sources, they could be used for projecting larger images, or projecting them over larger distances, or with greater intensity. There are numerous possible applications for high power image transistors.

SUMMARY OF THE INVENTION

It has been recognized that it would be advantageous to develop an image transistor which can utilize a high power light source without overheating.

In accordance with one embodiment thereof, the invention advantageously provides a light transistor system, including an image transistor, and a coolant passageway, extending through the image transistor. The image transistor has a liquid crystal modulator, configured to amplify a low-power light signal using amplification energy from a higher-power light source, such as a laser or arc lamp. The coolant passageway is configured to receive a flow of coolant therethrough, to allow cooling of the image transistor to prevent damage to it from the higher-power light source.

In accordance with a more detailed aspect of the present invention, the system includes a radiator disposed in a loop in fluid communication with the coolant passageway, configured such that thermal energy is removed from the coolant as it circulates by convection through the image transistor and the radiator.

In accordance with another more detailed aspect of the present invention, the system includes a radiator and pump disposed in a loop in fluid communication with the coolant passageway, configured to circulate the coolant through the image transistor and remove thermal energy therefrom.

Additional features and advantages of the invention will be apparent from the detailed description which follows, taken in conjunction with the accompanying drawings, which together illustrate, by way of example, features of the invention.

DETAILED DESCRIPTION

Figure 1:
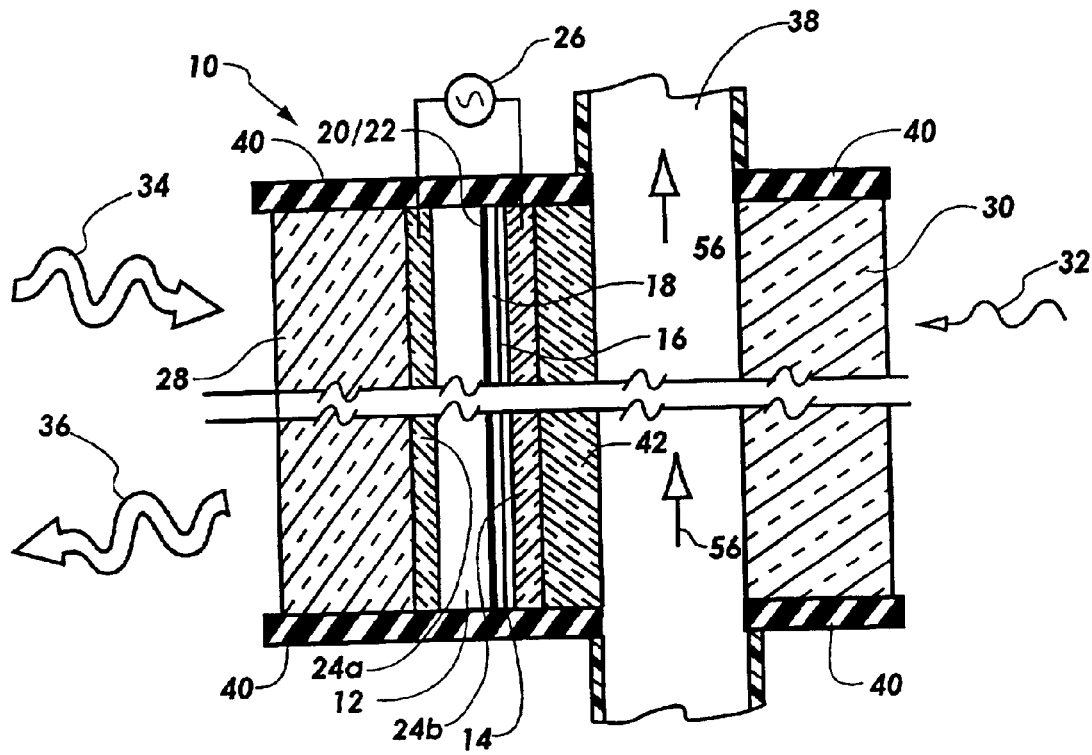
FIG. 1 is a cross-sectional view of one embodiment of an image transistor having a laminar flow coolant passageway in accordance with the present invention.

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

Figure 3:
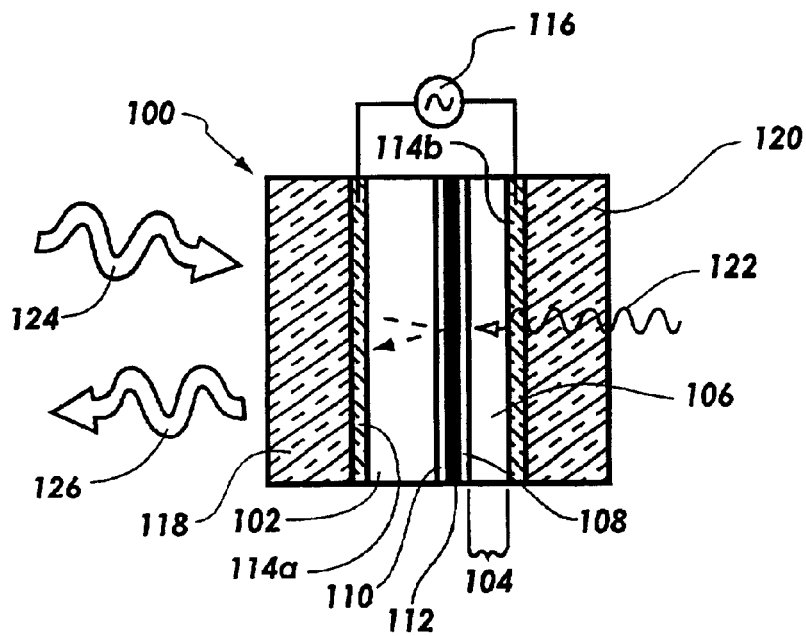
FIG. 3 is a cross-sectional view of a prior art image transistor.

U.S. Pat. No. 5,153,761 discloses a prior art image transistor. A cross-sectional view of a similar device is shown in FIG. 3. This image transistor 100 generally comprises a liquid crystal modulator 102, a photoconductor 104, including a charge separation layer 106 and a charge generation layer 108, with a mirror 110 and light block layer 112 disposed between the photoconductor and the modulator. Transparent electrodes 114a and 114b are disposed on opposing sides of the modulator 102, and these are connected to an electrical power source 116 for producing an electrical field that passes through the modulator and the photoconductor. The entire structure is disposed between a front glass 118 and rear glass 120.

In operation, a relatively low power image 122 is projected through the rear glass 122 and the rear electrode 114b, and onto the photoconductor 104. The light block layer 112 prevents this light from continuing on through the device. Higher power light energy 124 is projected through the front glass 118, the front electrode 114a, and the modulator 102, and is reflected off of the mirror 110. The interaction between the electric field produced by the electrodes and the photoconductor causes photon energy from the low power image to alter the state of the liquid crystal material in the modulator 102. This causes the characteristics of the low-power image to be transferred to the higher-power light, thus producing a high-power image 126, which is projected back through the front glass. With this device, any light projected onto the front glass will be reflected back in the form of an image projected onto the rear glass. Accordingly, the device allows higher-power transmission of low power light signals and images.

However, liquid crystal material has a very limited operating temperature range. Liquid crystal modulators are very sensitive to high temperatures, and become damaged, and eventually useless, if they are overheated. Without sufficient cooling in the presence of intense light, liquid crystals overheat and cease to function. The energy from a laser, for example, is likely to produce too much heat in the liquid crystal material. Consequently, image transistors such as the one depicted in FIG. 3 have heretofore been limited to use with low-power light sources, rather than sources suitable for large-screen, "cinematic" projection applications (e.g., high-power carbon arc lighting).

The inventors have advantageously invented an image transistor with a laminar flow liquid cooling system for allowing the image transistor to be used with higher power light sources, such as lasers or arc lights. Depicted in FIG. 1 is a cross-sectional view of one embodiment of an image transistor 10 with a laminar flow cooling system. As with the prior art, the image transistor 10 generally comprises a liquid crystal modulator 12, a photoconductor 14, including a charge separation layer 16 and a charge generation layer 18, with a mirror 20 and light block layer 22 disposed between the photoconductor and the modulator. These elements are sandwiched between transparent electrodes 24a and 24b, which are connected to an electrical power source 26 for producing an electrical field which passes through the modulator and the photoconductor. The entire structure is disposed between a front glass 28 and rear glass 30.

As with the prior image transistor, a relatively low power image 32 is projected through the rear glass 32 and onto the photoconductor 24. Higher power light energy 34 is projected through the front glass 28, the front electrode 24a, and the modulator 12, and is reflected off of the mirror 20. The electric field produced by the electrodes and disturbed by the low power image alters the state of the liquid crystal material in the modulator 12, causing the higher-power light to take on the characteristics of the lower-power image, thus producing a higher-power image 36, which is reflected back through the front glass.

Advantageously, the image transistor 10 includes a coolant passageway 38, which is configured to allow the flow of a coolant, such as water, to pass through the image transistor to dissipate heat that the higher-power light source will produce. A seal 40 is disposed on the top and bottom of the image transistor structure to prevent coolant from coming into contact with other portions of the device. In the embodiment of FIG. 1, the coolant passageway 38 is disposed between the rear glass 30 and an intermediate glass plate 42, which is placed adjacent the rear electrode 24b. Because light passes directly through water, a laminar flow of water, passing through the coolant passageway, can sufficiently cool the liquid crystal material of the modulator 12, without altering the optical properties of the image or degrading the performance of the device.

Figure 2:
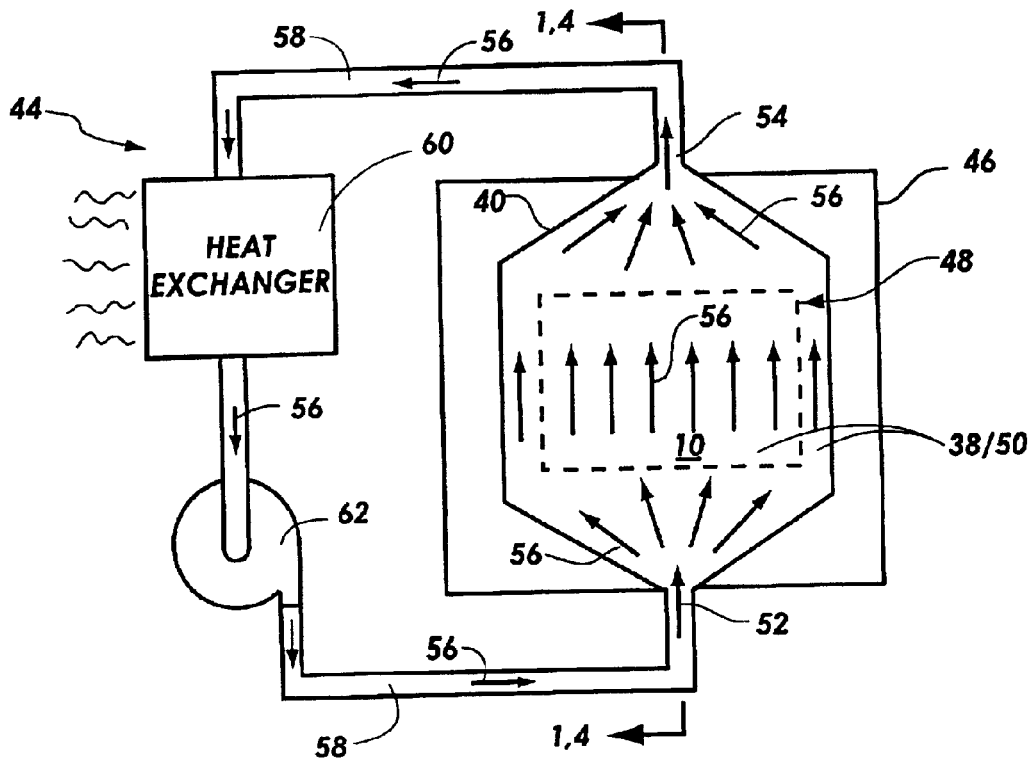
FIG. 2 is a schematic view of an image transistor system with a laminar flow cooling system in accordance with the present invention.

Depicted in FIG. 2 is a schematic view of an image transistor system 44 configured for use with the image transistor 10 of FIG. 1. The image transistor, shown in plan view in FIG. 2, is disposed in a housing 46 in alignment with an active image area 48. In this view, the low power light image and the reflected higher-power image 36 would be projected through the active image area along lines extending substantially normal to the plane of the drawing. The coolant passageway 38 includes a widened portion 50, which widens from a coolant inlet 52, through the image transistor 10 in the region of the active image area 48, then narrows again as it approaches a coolant outlet 54. It is the widened portion 50 of the coolant passageway 38 which is shown in cross-section in FIG. 1. The direction of the coolant flow is represented by arrows 56 in both FIG. 1 and FIG. 2.

A coolant conduit 58, which is just an extension of the coolant passageway 38, extends in a loop from the coolant outlet 54 back to the coolant inlet 52. Disposed along the course of this loop are a heat exchanger, or radiator 60 and a pump 62. There are a variety of types and configurations of heat exchange or radiator-type structures which are suitable for use with the present invention, and these are well known by those skilled in the art. In a very simple embodiment, the heat exchanger 60 comprises the coolant conduit 58 exposed along its length, so as to radiate thermal energy to the outside environment, with no other structure. Alternatively, the coolant conduit 58 could be branched into several smaller conduits (not shown) which reunite to provide a larger surface area for heat dissipation. As yet another alternative, the heat exchanger 60 could be a more complex radiator-type structure, including baffles or fins and multiple passageways to allow greater heat dissipation. It will also be apparent that the heat exchanger could include a cooling fan (not shown) to improve its performance.

The pump 62 is optional, depending on the type of heat exchanger used. In the heat exchange embodiments described above, the coolant may flow through the loop via convection, providing a simple and natural method of cooling. However, a pump may be interposed in the system as shown to increase the flow rate of the coolant, depending on the nature of the heat exchanger and the thermal energy dissipation required. One skilled in discipline of thermodynamics will be able to determine the exact needs and configuration for the pump and heat exchanger. Whether pumped or depending on convection, after passing through the image transistor 10 and absorbing thermal energy, the temperature of the coolant drops as it passes through the heat exchanger, and the lower temperature coolant returns to the coolant inlet 52.

Water is believed to be the most likely coolant. However, it is possible that coolants other than water could be used, so long as they are non-reactive with the glass or other components of the system, and are optically transparent at the wavelengths of interest (both the low-power signal and the high-power light). The wavelengths of light which are anticipated to be used with this device will vary with the photoconductor used, but will generally cover a range extending from the upper infrared through the visible spectrum. It will also be apparent that the coolant must have a viscosity which will permit proper flow, and it must be free from contaminants or bubbles which could interfere with the image.

Figure 4:
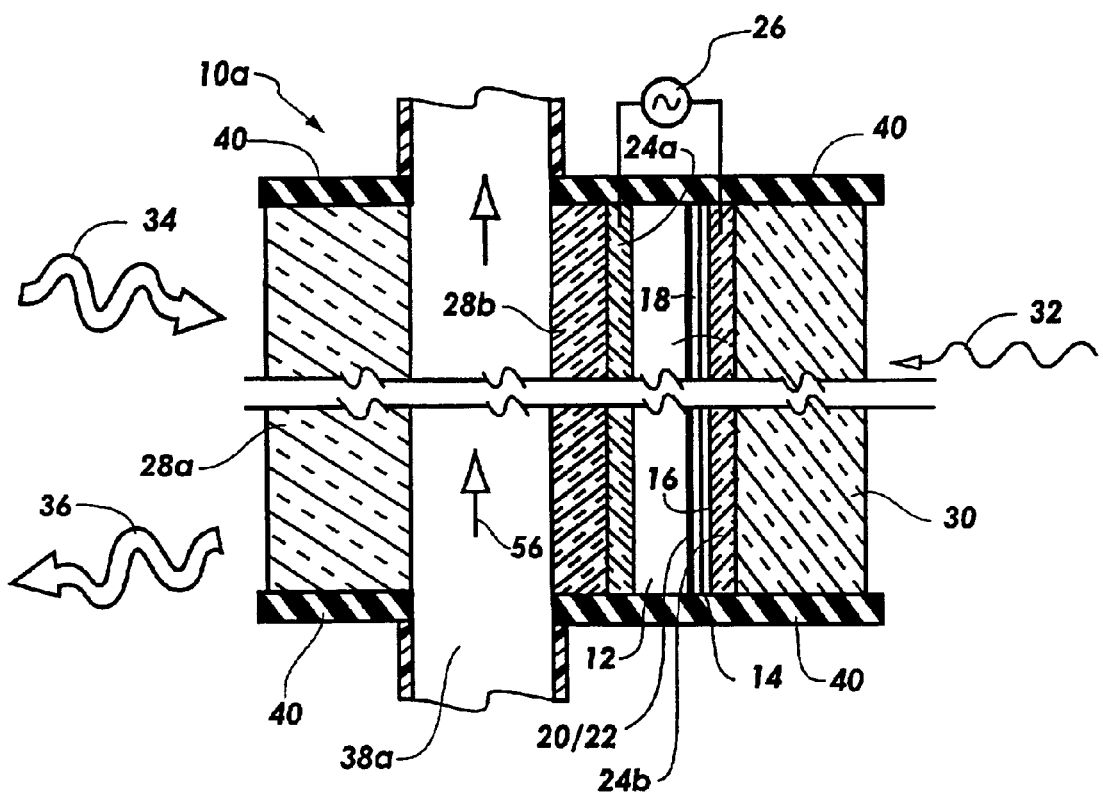
FIG. 4 is a cross-sectional view of an alternative embodiment of the present invention, wherein the coolant passageway is disposed adjacent the front glass of the image transistor.

The coolant passageway 38 may extend through the image transistor in locations other than that shown in FIG. 1. In FIG. 1, the coolant passageway is disposed rearwardly of the photoconductor 14, between the rear electrode 24b and the rear glass 30. However, the coolant passageway 38 may be disposed in other locations, such as adjacent to the front glass, as depicted in FIG. 4. The primary factors affecting the location of the coolant passageway relate to the tradeoff between cooling efficacy versus other mechanical considerations for a given application, such as preferred locations for coolant intake and outlets in a given mounting scheme. In the embodiment of the image transistor 10a depicted in FIG. 4, the front glass includes a front portion 28a and a rear portion 28b, with the coolant passageway 38b disposed therebetween. It is believed that placing the coolant passageway in this location may provide a slight advantage in cooling because it places the coolant closer to the surfaces subjected to the high intensity light. In any event, the desire is that the coolant passageway cover the entire active image area (48 in FIG. 2), regardless of its location relative to the front and rear of the image transistor.

With this system, much higher power light sources, including lasers and arc lights, may be used with image transistors than have been used heretofore. Consequently, image transistors can be used for transmitting very high power light images, projecting larger images, projecting them over larger distances, and with greater intensity. This system may also be adapted to other uses in addition to projecting images, such as optical communications or data transfer.

It is to be understood that the above-referenced arrangements are only illustrative of the application of the principles of the present invention. Numerous modifications and alternative arrangements can be devised without departing from the spirit and scope of the present invention while the present invention has been shown in the drawings and fully described above with particularity and detail in connection with what is presently deemed to be the most practical and preferred embodiments(s) of the invention, it will be apparent to those of ordinary skill in the art that numerous modifications can be made without departing from the principles and concepts of the invention as set forth in the claims.

What is claimed is:

1. A light transistor system, comprising:
   a) an image transistor, having a liquid crystal modulator, configured to amplify a light signal using amplification energy from a light source; and
   b) a coolant passageway, extending through the image transistor, configured to receive a flow of optically neutral coolant therethrough, to allow cooling of the image transistor.

2. A light transistor system in accordance with claim 1, further comprising a heat-radiating device, in fluid communication with the coolant passageway, configured to cool the coolant.

3. A light transistor system in accordance with claim 2, wherein the coolant passageway comprises a loop, and is configured such that the coolant circulates through the image transistor and the heat-radiating device by convection.

4. A light transistor system in accordance with claim 2, further comprising a pump, in fluid communication with the coolant passageway and the heat-radiating device, configured to pump the coolant through the coolant passageway and the heat-radiating device.

5. A light transistor system in accordance with claim 4, wherein the pump is configured to provide a laminar flow of coolant through the coolant passageway.

6. A light transistor system in accordance with claim 1, wherein the light signal comprises a light image.

7. A light transistor system in accordance with claim 1, wherein the image transistor further comprises:
   a) a photoconductor, having a charge separation layer and a charge generation layer, disposed behind the modulator, and configured to receive a light image from an image source;
   b) a reflective surface, having a light blocking layer, disposed between the modulator and the photoconductor, configured to reflect high-power light energy transmitted through the modulator; and
   c) electrodes, disposed near the modulator, and configured to create an electrical field therearound, whereby the characteristics of the light image received by the photoconductor are transferred to the high power light energy by the modulator, to produce a high power light signal having the characteristics of the low power light image.

8. A light transistor system in accordance with claim 1, further comprising:
   a) a photoconductor, associated with the image transistor and disposed behind the liquid crystal modulator;
   b) a high-power light source, projected onto a front side of the image transistor, so as to impinge upon the liquid crystal modulator; and
   c) a low-power light signal source, projected onto a back side of the image transistor, so as to impinge upon the photoconductor.

9. A light transistor system in accordance with claim 8, wherein the high-power light source is selected from the group consisting of a laser light source and an arc lamp.

10. A light transistor system, comprising:
    a) an image transistor, having a front side, a back side, a liquid crystal modulator, and a photoconductor, and configured to amplify a light signal using amplification energy from a light source;
    b) a high-power light source, aimed at the front side of the image transistor, so as to impinge upon the liquid crystal modulator;
    c) a low-power image source, aimed at the back side of the image transistor, so as to impinge upon the photoconductor;
    d) a coolant passageway, extending through the image transistor, and having coolant therein; and
    e) a radiator, in fluid communication with the coolant passageway, configured to remove thermal energy from the coolant, so as to cool the image transistor.

11. A light transistor system in accordance with claim 10, further comprising a pump, in fluid communication with the coolant passageway and the radiator, configured to pump coolant through the coolant passageway and the heat-radiating device.

12. A light transistor system in accordance with claim 10, wherein the coolant passageway is disposed adjacent the back side of the image transistor.

13. A light transistor system in accordance with claim 10, wherein the coolant passageway is disposed adjacent the front side of the image transistor.

14. A light transistor system in accordance with claim 10, wherein the high-power light source is selected from the group consisting of a laser light source and an arc lamp.

15. A light transistor, comprising:
    a) a liquid crystal modulator;
    b) a photoconductor, disposed rearwardly of the modulator;
    c) a reflective surface, disposed between the modulator and the photoconductor;
    d) electrodes, disposed near the modulator, configured to create an electrical field therearound, such that the characteristics of a low-power light image projected onto the photoconductor are transferred to a higher-power light beam projected onto the modulator and reflected off of the reflective surface; and
    e) a coolant passageway, configured to pass a laminar flow of coolant near the modulator.

16. A light transistor in accordance with claim 15, wherein the coolant passageway is disposed rearwardly of the photoconductor.

17. A light transistor in accordance with claim 15, wherein the coolant passageway is disposed forwardly of the modulator.

18. A light transistor in accordance with claim 15, wherein the coolant passageway is disposed rearwardly of the modulator.

19. A light transistor in accordance with claim 15, further comprising a front glass disposed forwardly of the liquid crystal modulator, and a rear glass disposed rearwardly of the photoconductor, the low-power image source being projected through the rear glass, and the higher-power light beam being projected through the front glass.

20. A light transistor in accordance with claim 15, wherein the electrodes comprise transparent electrodes, and are disposed on opposing sides of the liquid crystal modulator.

* * * * *